(12) United States Patent
Chiles et al.

(10) Patent No.: US 10,732,348 B2
(45) Date of Patent: Aug. 4, 2020

(54) PHOTONIC APPARATUS FOR CONTROLLING POLARIZATION

(71) Applicant: University of Central Florida Research Foundation, Inc., Orlando, FL (US)

(72) Inventors: Jeffrey Chiles, Boulder, CO (US); Sasan Fathpour, Orlando, FL (US)

(73) Assignee: Th University of Central Florida Research Foundation, Inc., Orlando, FL (US)

(*) Notice: Subject to any disclaimer, the term of this patent is extended or adjusted under 35 U.S.C. 154(b) by 0 days.

(21) Appl. No.: 16/214,456

(22) Filed: Dec. 10, 2018

(65) Prior Publication Data

US 2019/0204504 A1 Jul. 4, 2019
US 2020/0209467 A9 Jul. 2, 2020

Related U.S. Application Data

(63) Continuation-in-part of application No. PCT/US2017/036505, filed on Jun. 8, 2017.
(Continued)

(51) Int. Cl.
*G02B 6/02* (2006.01)
*G02B 5/30* (2006.01)
(Continued)

(52) U.S. Cl.
CPC ........ *G02B 6/02109* (2013.01); *G02B 5/285* (2013.01); *G02B 5/3008* (2013.01);
(Continued)

(58) Field of Classification Search
CPC .............. G02B 6/02109; G02B 5/3008; G02B 6/0056; G02B 6/2726; G02B 6/126; G02B 5/285; G02B 6/125
See application file for complete search history.

(56) References Cited

U.S. PATENT DOCUMENTS 6,580,862 B2 * 6/2003 Kominato .............. G02B 6/105
385/129
6,687,425 B2 * 2/2004 Ridgway ................. G02F 1/065
385/129
(Continued)

*Primary Examiner* — Ryan A Lepisto
(74) *Attorney, Agent, or Firm* — Suiter Swantz pc llo

(57) ABSTRACT

A photonic device has a polarization-dependent region and a device layer including a first cladding film, a second cladding film, and a core film. The core film includes one of (1) a material having an index $n_M$ and (2) alternating layers of a first material having a first index and second material having a second index. The alternating layers have an effective index for TE polarized light $n_{TE}$ and an effective index for TM polarized light $n_{TM}$. Each of the first cladding film and the second cladding film include the other of (1) the material having the index of refraction $n_M$ and (2) the alternating layers $n_{TM}<n_M<n_{TE}$, and the indices of the upper cladding and the lower cladding are less than $n_{TM}$, $n_M$ and $n_{TE}$. A polarizer, polarizing beam splitter and coupler using clipped coupling can employ the material having an index $n_M$ and the alternating layers.

13 Claims, 13 Drawing Sheets

Related U.S. Application Data

(60) Provisional application No. 62/347,212, filed on Jun. 8, 2016.

(51) Int. Cl.
*F21V 8/00* (2006.01)
*G02B 6/27* (2006.01)
*G02B 6/126* (2006.01)
*G02B 5/28* (2006.01)
*G02B 6/125* (2006.01)

(52) U.S. Cl.
CPC ........... *G02B 6/0056* (2013.01); *G02B 6/125* (2013.01); *G02B 6/126* (2013.01); *G02B 6/2726* (2013.01)

(56) References Cited

U.S. PATENT DOCUMENTS

| | | |
|---|---|---|
| 7,072,098 B2 | 7/2006 | Solli |
| 7,450,811 B2 * | 11/2008 | Hashimoto ............ G02B 6/126 385/129 |
| 2003/0081873 A1 | 5/2003 | Tan et al. |
| 2005/0128592 A1 | 6/2005 | Nishii et al. |
| 2006/0078254 A1 | 4/2006 | Djordjev et al. |
| 2013/0064515 A1 | 3/2013 | Shurgalin et al. |

* cited by examiner

PHOTONIC APPARATUS FOR CONTROLLING POLARIZATION

CROSS REFERENCE

This application is a continuation-in-part (CIP) application of PCT application number PCT/US2017/036505 entitled "PHOTONIC APPARATUS, METHOD, AND APPLICATIONS" filed Jun. 8, 2017 which claims the benefit of U.S. Provisional Patent Application Ser. No. 62/347,212 filed Jun. 8, 2016, the subject matter of both being herein incorporated by reference in their entireties.

STATEMENT REGARDING FEDERALLY SPONSORED RESEARCH

This invention was made with Government support under Career Award # ECCS 1150672 awarded by The National Science Foundation. The government has certain rights in this invention.

FIELD

This Disclosure relates to photonic methods and apparatus for controlling polarization, and in particular integrated photonic methods and apparatus for controlling polarization.

BACKGROUND

Polarization management is generally a critical requirement for state-of-the-art integrated photonic systems. Conventional photonic structures exhibit a high degree of asymmetry in the vertical direction, either by design or by limitations of the particular fabrication method employed. Also, the achievable refractive index contrast, which affects the achievable compactness of the photonic structures desired, is typically small, which has the particular disadvantage of poor temperature stability, and cannot be brought to very small dimensions as a restriction of methods employed. Key building blocks such as polarizers and polarization beam-splitters (PBS) to date have achieved operation over only limited optical bandwidths, thus limiting their uses.

Polarization management in modern integrated photonics is conducted in a variety of ways, depending on the processes available or the platforms considered. Most commonly, a polarization-filtering effect is achieved using a metal cladding or grating on the surface of a waveguide, which introduces large losses for one polarization but not for the other polarization. Alternatively, shallow etching is applied to one area of a waveguide such that the transverse-magnetic (TM) light will leak out. These methods generally require significant additional processing on a wafer in order to achieve polarization. Furthermore, if both TM and transverse-electric (TE) polarization are desired, the amount of additional processing increases further since separate designs are needed to process TE polarized light and the TM polarized light. Additionally, large losses for the "pass" polarization can result from their interaction with metal claddings, or from transitions between shallow and deep etched regions. The demonstrated bandwidths of conventional integrated polarizes and PBS are fairly limited, generally not exceeding 100 nm in the telecom band.

Concerning integrated PBS devices, state-of-the-art approaches are typically precision-engineered directional couplers that selectively couple one polarization into a specific output channel but not the other polarization. Although they can be quite compact, they generally either require difficult-to-fabricate geometries (e.g., two waveguides of different height next to each other), or complicated additional processing steps. Still, the bandwidths are typically limited to <300 nm even in simulated designs.

In the telecommunications market, polarization diversity functions are often implemented in fiberized components that are bulky and expensive. In remote optical sensing, it is often desirable to extract information on the polarization dependence of a received signal from a target. Additionally, spectroscopic analysis may be needed simultaneously with the information extraction. Such processing can generally be achieved with free-space optics, but such free-space optics systems are alignment sensitive and expensive to implement.

SUMMARY

This Summary is provided to introduce a brief selection of disclosed concepts in a simplified form that are further described below in the Detailed Description including the drawings provided. This Summary is not intended to limit the claimed subject matter's scope. Aspects of an invention are defined in the appended independent claims.

This Disclosure recognizes there is a need for improved integrated photonic devices to control polarization. Disclosed photonic devices for controlling polarization utilize a fundamentally different technique where a birefringent effect is derived from the behavior of a multilayer film having an alternating refractive index (alternating layers of a first material having a first index of refraction and second material having a second index of refraction) in the device layer itself, with the alternating layers in the device layer being in the core film or the side cladding film around the core film. Disclosed photonic devices are for performing polarization-selective operations on integrated photonic channels, that enables greater optical bandwidths (e.g., more than an octave in frequency) to be achieved in devices such as polarizers and PBS's. Furthermore, disclosed techniques enable optical functionality that is not possible with conventional photonic devices. For example, disclosed photonic devices for controlling polarization enable the co-existence of "transverse-electric-only" and "transverse-magnetic-only" single-polarization waveguides on a same layer of a single device, as well as waveguides supporting both polarizations. Disclosed configurations lead to other novel devices such as photonic resonators that are nearly invisible to light of one polarization, but which interact normally with light polarized in the orthogonal direction.

Some disclosed aspects enable both TE and TM polarizers to be implemented together, and with no additional processing compared to the normal fabrication flow. Furthermore, in some aspects, because of the high degree of symmetry in the structure and its wavelength-independent operation, bandwidths spanning an octave are achievable, representing a landmark improvement over conventional devices.

Disclosed aspects include an arrangement of optical materials on a substrate (a photonic device) that enables precise and spatially variable control of the refractive index experienced by light of different polarizations interacting with the photonic device. As such, optically anisotropic features can be exploited for useful functions on an integrated photonic platform.

In accordance with one aspect, there is provided a photonic device for guiding light in a first direction, the light having a wavelength $\lambda$, the device having a polarization-dependent region comprising a lower cladding layer, and a device layer disposed on the lower cladding layer. The device layer comprises a first cladding film and a second cladding film, and a core film extending in the first direction between the first cladding film and the second cladding film. The device further comprises an upper cladding layer disposed on the device layer. The core film comprises one of (1) a material having an index of refraction $n_M$ and (2) alternating layers of a first material having a first index of refraction and second material having a second index of refraction different than the first material, the alternating layers having an effective index of refraction for TE polarized light $n_{TE}$ and an effective index of refraction for TM polarized light $n_{TM}$. Each of the first cladding film and the second cladding film comprises the other of (1) the material having the index of refraction $n_M$ and (2) the alternating layers. $n_{TM}$ is greater than $n_M$ which is greater than $n_{TE}$ at the wavelength λ. The index of refraction of the upper cladding and the index of refraction of lower cladding are both less than $n_{TM}$, $n_M$ and $n_{TE}$ at wavelength λ.

In some embodiments, the difference between $n_{TM}$ and $n_M$ is substantially equal to the difference between $n_M$ and $n_{TE}$, at the wavelength λ. The difference between $n_{TM}$ and $n_{TE}$ may be in the range 0.01 to 0.8.

In some embodiments the core film comprises the material having an index of refraction $n_M$. In some embodiments, the core film comprises the alternating layers. In some embodiments, the device further comprises an input electromagnetic (E/M) waveguide having an input core optically coupled to the core film.

The input E/M waveguide may comprise an input E/M waveguide lower cladding layer, an input E/M waveguide device layer disposed on the input E/M waveguide lower cladding layer, the input E/M waveguide device layer comprising an input E/M waveguide first cladding film and an input E/M waveguide second cladding film, and the input core extending in the first direction between the input E/M waveguide first cladding film and the input E/M waveguide second cladding film, and an input E/M waveguide upper cladding layer disposed on the input E/M waveguide device layer. The input core comprises a material having index of refraction greater than the index of refraction of the input E/M waveguide lower cladding layer, the input E/M waveguide first cladding film, the input E/M waveguide second cladding film and the upper cladding layer at wavelength λ.

In some embodiments, the device is a polarizer, the device further comprising a first transition region disposed between the input waveguide and the polarization-dependent region where a width of the first cladding film is disposed between the core film and a width of the input E/M waveguide first cladding film, and a width of the second cladding film is disposed between the core film and a width of the input E/M waveguide second cladding film. In the first transition region, (1) the width of the first cladding film increases and the width of the input E/M waveguide first cladding film decreases along the first direction and (2) the width of the second cladding film increases and the width of the input E/M waveguide second cladding film decreases along the first direction.

In some embodiments, the device further comprising an output E/M waveguide having an output core optically coupled to the core film, at an opposite end from the input E/M waveguide.

In some embodiments, the output E/M waveguide comprises an output E/M waveguide lower cladding layer, an output E/M waveguide device layer disposed on the output E/M waveguide lower cladding layer, the output E/M waveguide device layer comprising an output E/M waveguide first cladding film and an output E/M waveguide second cladding film, and the input core extending in the first direction between the output E/M waveguide first cladding film and the output E/M waveguide second cladding film, and the E/M waveguide comprises an output E/M waveguide upper cladding layer disposed on the output E/M waveguide device layer. The output core comprises a material having an index of refraction greater than the index of refraction of the output E/M waveguide lower cladding layer, the output E/M waveguide first cladding film, the output E/M waveguide second cladding film and the upper cladding layer at wavelength λ.

In some embodiments, the device further comprise a second transition region disposed between the output waveguide and the polarization-dependent region where a width of the first cladding film is disposed between the core film and a width of the output E/M waveguide first cladding film, and a width of the second cladding film is disposed between the core film and a width of the output E/M waveguide second cladding film. In the second transition region, (1) the width of the first cladding film decreases and the width of the output E/M waveguide first cladding film increases along the first direction and (2) the width of the second cladding film decreases and the width of the E/M waveguide second cladding film increases along the first direction.

In some embodiments, the polarizer is a TE-pass polarizer. In some embodiments, the polarizer is a TM-pass polarizer.

Another disclosed aspect is directed to a photonic device to guide light in a first direction, the light having a wavelength λ, comprising: a bus waveguide; and a second waveguide having a core characterized by a width equal to W transverse to the core and the bus waveguide, the second waveguide having a first tapered region proximate the bus waveguide in which the width is reduced along the first direction, and a second tapered region proximate the bus waveguide in which the width is increased along the first direction back to W, the second waveguide being evanescently coupled to the bus waveguide between the first tapered region and the second tapered region. The device further comprises a cladding material disposed between the bus waveguide and the second waveguide, and the second waveguide comprising one of (1) a material having an index of refraction $n_M$ and (2) alternating layers of a first material having a first index of refraction and second material having a second index of refraction different than the first material, the alternating layers having an effective index of refraction for TE polarized light $n_{TE}$ and an effective index of refraction for TM polarized light $n_{TM}$. The bus waveguide comprises the other of (1) the material having an index of refraction $n_M$ and (2) the alternating layers, and $n_{TM} < n_M < n_{TE}$ at the wavelength λ, and the index of refraction of the upper cladding and the lower cladding is less than $n_{TE}$, $n_{TM}$ and $n_{TE}$ at wavelength λ.

In some embodiments, the second waveguide is a ring waveguide. In some embodiments, the bus waveguide comprises the material having an index of refraction $n_M$. In some embodiments, the bus waveguide comprises the alternating layers. Still further aspects of the invention are directed to a photonic device to guide light in a first direction and to divide the light into a first output having only TE-polarized light and a second output having only TM-polarized light, the light having a wavelength λ, the device comprising a lower cladding layer, a device layer disposed on the lower cladding layer, an upper cladding layer disposed on the device layer, the device layer comprising a first cladding film and a second cladding film, and a core film extending in the first direction between the first cladding film and the second cladding film, the core film comprising a transition region and a separation region. In the transition region, the core film comprises an input core having a first width transverse to the first direction and a transition core contacting the input core and the transition core having a second width that increases along the first direction until core film has a width equal to the 1.3 to 3.0 times the input core width; and in the separation region, the input core is separated from the transition core by a separation distance that increases along the first direction to a size that prevents coupling of the light of wavelength λ between the input core and the transition core.

The input core comprises one of (1) a material having an index of refraction $n_M$ and (2) alternating layers of a first material having a first index of refraction and second material having a second index of refraction different than the first material, the alternating layers having an effective index of refraction for TE polarized light $n_{TE}$ and an effective index of refraction for TM polarized light $n_{TM}$. The transition core comprises the other of (1) the material having an index of refraction $n_M$ and (2) the alternating layers. $n_{TE}$ is less than $n_M$ which is less than $n_{TE}$ at the wavelength λ. Each of the upper cladding layer, the lower cladding layer, the first cladding film, the second cladding film and the separation cladding film have an index of refraction less than each of $n_{TM}$, $n_M$, $n_{TE}$ at wavelength λ. Accordingly, the input core forms the output of only a first of TE-polarized light and the TM-polarized light, and the transition core forms an output of only a second of the TE-polarized light and the TM-polarized light. The input core and the transition core are separated from one another in the separation region at an angle from 0.1 to 10 degrees.

In some embodiments, the first width equals the second width where the transition region and the separation region meet.

In some embodiments, the device further comprises a second transition region where the transition core has a constant width and the input core has a width that increases along the first direction.

BRIEF DESCRIPTION OF THE DRAWINGS

Reference will now be made to the accompanying drawings, which are not necessarily drawn to scale, wherein.

DETAILED DESCRIPTION

Figure 1:
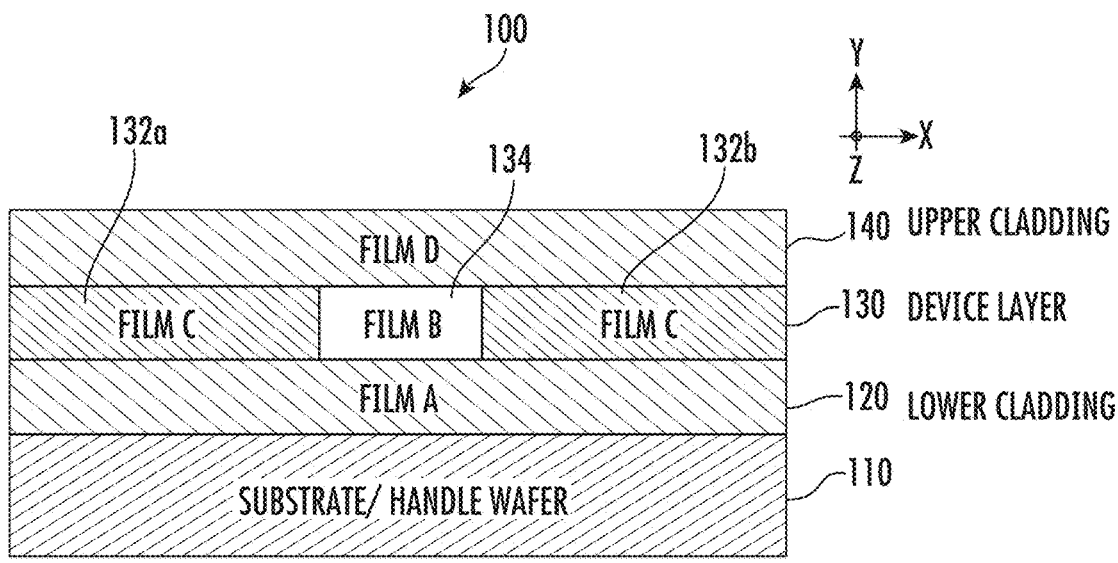
FIG. 1 is a cross-sectional view of an example of a photonic device for propagating only light having a TM-polarization, according to aspects of the present invention.

Example aspects are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

FIG. 1 is a cross-sectional view of an example of a photonic device 100 according to a disclosed aspect configured to guide light in a Z-direction, the light having a wavelength λ. As used herein, the Z-direction is shown as the light propagation direction including as shown in FIG. 1 (being the direction into the page), and the X-Y plane is the cross-sectional plane that is perpendicular to the Z-direction. When herein referring to the in-plane direction, with this convention, this refers to the X-Z plane. Photonic device 100 comprises optical materials that can be deposited onto a thick handle substrate (substrate) 110 (e.g., a wafer, generally several 100s of μms thick) to form the features enumerated below. With this convention, the substrate 110 has an in-plane oriented area dimension along the X-Z plane and a thickness dimension in the Y-direction.

Photonic device 100 comprises a lower cladding layer 120 shown as Film A, a device layer 130 comprising a first side cladding film 132a shown as Film C and a second side cladding film 132b also shown as Film C, a core film 134 shown as Film B, and an upper cladding layer 140 shown as Film D. The device layer 130 as described in detail below has a periodic structure with an orientation where the periodic films of the device layer 130 are oriented parallel to the in-plane direction of the substrate 110 is substantially different conventional vertically oriented (stacked) layers which are oriented in the thickness dimension of the substrate 110 (and perpendicular to the in-plane dimension of the substrate). Disclosed arrangements have the advantage of precision control in thicknesses via standard deposition methods, as well as extremely low interface roughness, in contrast to conventional vertically oriented elements.

Examples of methods for fabricating structures such as photonic device 100 are provided below with reference to FIGS. 16 to 26 that are described below. The cross-sectional structure of the photonic device 100 in FIG. 1 remains the same in the Z-direction (the light propagation direction) as described, where the Z-direction is along the X-Z plane (the in-plane direction of the substrate 110). Over a selected length, as discussed below with reference to FIGs described below, a device having a cross section as illustrated in FIG. 1 can be combined with one or more structures to form devices having a different cross section, to selectively process light propagating in the Z-direction.

The substrate 110 can be constructed of any suitable material currently known or later developed for maintaining photonic devices described herein. For example, the substrate 110 may have a thickness between 300 and 1,000 μm. The lower-cladding film 120 is formed on the top surface of substrate 110 and has a refractive index $n_A$. For example, the lower-cladding film 120 may have a thickness between 0.5 to 10 μm.

Figure 2:
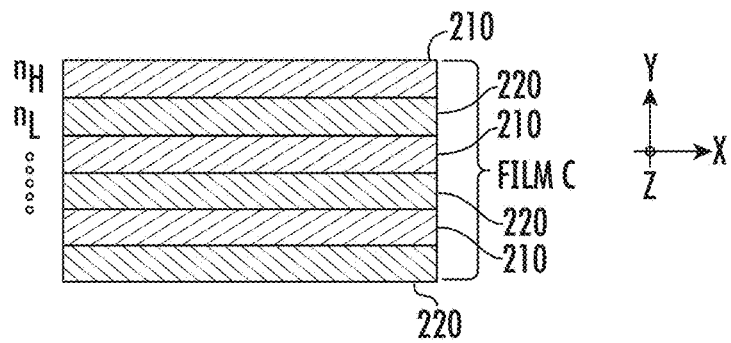
FIG. 2 is an expanded cross-sectional view of Film C of the photonic device of FIG. 1.

The device layer 130 is formed on top of the lower cladding film 120. Device layer 130 comprises first side cladding film 132a and second side cladding film 132b, and the core film 134 extends in the Z-direction between the first side cladding film 132a and second side cladding film 132b. In the illustrated embodiment, the core film 134 has a refractive index $n_m$ and the film for the first side cladding film 132a and second side cladding film 132b is anisotropic. It is typically desirable that the films of the device layer 130 (e.g., core film 134 and film for the side claddings have thicknesses equal to one another (ideally within a difference of less than 10% between the height of core film 134 and the height of film for the side claddings)). As illustrated in FIG. 2, the film for the side claddings shown as Film C is constructed of alternating layers of two different materials shown as layer 210 and layer 220 that alternate (are periodic) in the X-Z plane as shown which have refractive indices $n_H$ and $n_L$, respectively. The index of refraction $n_H$ of layer 210 is higher than the index of refraction of layer 220, at working wavelength λ. Any suitable light source (not shown) may be present to provide the light of wavelength λ. For example the light source may generate the light such as a laser, or the light source may direct the light to the device such as an optical fiber or another waveguide (e.g., an E/M waveguide as described below).

The alternating layers 210, 220 have thicknesses that are much smaller than the shortest optical wavelength λ that is to be processed by photonic device 100 such that the effective medium approximation holds. For example, the thicknesses of the alternating layers 210, 220 in the cross-sectional (XY) plane may be less than 1/10th the effective wavelength of the light inside the core material. As a result of the relatively small thicknesses of layers 210, 220, the film for the side claddings can be considered to have an effective refractive index that depends on the relative thickness and index of each particular layer, and which also depends on the polarization of light under consideration due to the different continuity relations for the electric and magnetic fields. Mathematical expressions of the effective medium approximation are shown below as Equations 1(a) and 1(b) for TE and TM light, respectively. Layers 210 may be identical to one another, and layers 220 may be identical to one another; however, some variation is possible.

The effective refractive indices for the transverse-electric (TE) and transverse-magnetic (TM) polarizations, $n_{TE}$ and $n_{TM}T$, are chosen to be greater than and lower than the refractive index $n_M$ of the core film 134, ($n_{TM} < n_M < n_{TE}$), respectively. It is typically desirable that indices $n_{TE}$ and $n_M$ are separated from refractive index $n_M$ by an approximately equal value. A relatively larger separation between $n_{TM}$ to $n_{TE}$ is generally desirable; for example a separation of 0.01 to 0.8 at operating wavelengths λ is generally advantageous. In some embodiments the separation is in the range 0.1 to 0.8 at an operating wavelength.

Upper cladding 140 is disposed on top of the device layer 130, and typically has a thickness between 0.5 to 10 μm, comprising a material with a refractive index $n_D$ that is approximately equal to that of the lower cladding 120, $n_A$. Refractive index $n_D$ advantageously is within a difference of <0.05 refractive index units of $n_A$. Also, the index of refraction of the upper cladding 140 and the lower cladding 120 is less than $n_M$ (i.e., the refractive index of the core film) at wavelength λ, and the index of refraction of the upper cladding 140 and the lower cladding 120 is typically less than $n_{TM}$ and $n_{TE}$ at wavelength λ.

It will be appreciated that when the above arrangement is realized, it becomes possible to propagate light in core film 134 that exhibits different behaviors depending on the polarization of light in use. For example, in the embodiment of FIG. 1, the device layer 130 is shown to comprise mainly of the film for the side cladding films 132a, 132b, except for a narrow rectangular core film 134 (corresponding to a rectangular waveguide extending along the Z-direction), which comprises another film shown as Film B. For light that is polarized in the vertical direction (the Y-direction), corresponding to the TM optical mode, the effective refractive index of the surrounding side cladding films 132a, 132b is lower than the refractive index of the core film 134, causing the optical mode to be confined to core film 134 through total internal reflection. However, for light that is polarized in the horizontal direction (along the X-direction), corresponding to the TE mode, the effective refractive index of the film surrounding side cladding 132a, 132b is greater than that of the core film 134. Thus, TE-polarized light is not confined to core film 134, and is radiated out of core film 134. In other words, the core film 134 does not support a mode for the TE polarization, although core film 134 does support a mode for TM-polarized light. Photonic device 100 can thus be considered a "TM-only" waveguide. Such polarization-dependent operation holds for all wavelengths λ for which the effective medium approximation is satisfied meaning that there is a short-wavelength cutoff but there is no cutoff in the long-wavelength regime, and for which the relationship $n_{TM} < n_M < n_{TE}$ is maintained.

Figure 3:
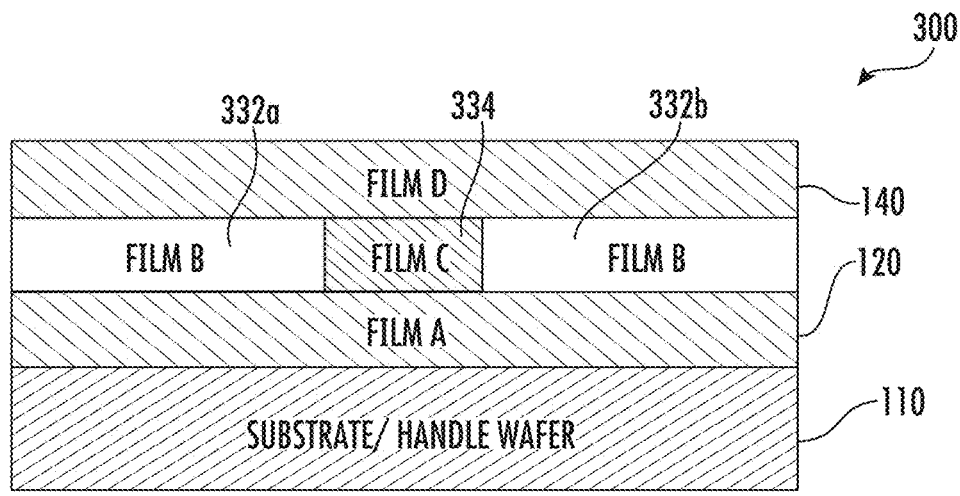
FIG. 3 is a cross-sectional view of an example of a photonic device for propagating only light having a TE-polarization, according to aspects of the present invention.

It can also be recognized that the same approach allows for construction of "TE-only" waveguides. An example of a TE-only photonic device 300 is illustrated in FIG. 3, which is the "complement" of the arrangement shown in FIG. 1. Photonic device 300 is the result of switching the material of core 334 and the cladding 332a, 332b materials relative to those of the TM-only arrangement of device 100. Accordingly, in photonic device 300, because the refractive index of the cladding 332a, 332b is lower than that of the core film 334, TM-polarized light is no longer guided, but the TE-polarized light is. Thus disclosed techniques readily enable broadband "TM-only" and/or "TE-only" single-polarization waveguides to be realized on a common layer, without any additional processing beyond normal fabrication flow required to define each type. Also, the index of refraction of the upper cladding 140 and the lower cladding 120 is less than $n_{TM}$ and $n_{TE}$ (i.e., the indices of the core) at wavelength λ, and the index of refraction of the upper cladding 140 and the lower cladding 120 is typically less than $n_M$ at wavelength λ.

It will be appreciated that in each of photonic devices 100 and 300, the core films 134, 334 comprise one of (1) a material having an index of refraction $n_M$, and (2) alternating layers of a first material having a first index of refraction $n_H$ and second material having a second index of refraction $n_L$ different than the first material. The alternating layers have an effective index of refraction for TE-polarized light $n_{TE}$ and an effective index of refraction for TM-polarized light $n_{TM}$, where $n_{TE}$ and $n_{TM}$ are defined as follows.

$$(n_{TE})^2 = f \times (n_H)^2 + (1-f)(n_L)^2 \quad \text{Equation 1(a)}$$

$$1/(n_{TM})^2 = f/(n_H)^2 + (1-f)/(n_L)^2 \quad \text{Equation 1(b)}$$

where $n_{TE} < n_M < n_{TE}$ at the wavelength λ, and f is the fill factor of the $n_H$ material in an $n_H$–$n_L$ pair of layers.

Each of first cladding film 132a, 332a and the second cladding film 132b, 332b comprise the other of (1) the material having an index of refraction $n_M$ and (2) the alternating layers.

It will be appreciated that embodiments of systems employing polarization-dependent devices as described above, also support the integration of more conventional waveguides (i.e., that support propagation of both polarizations TE and TM) onto the device layer. It will be appreciated that such ability is desirable since for many applications, such as high-speed communication or remote sensing, it is desirable to transmit and subsequently process both polarization states in order to preserve flexibility of design. For example, conventional waveguides can be achieved by arranging the materials (of photonic devices 100 and 300) as in FIG. 4A or FIG. 4B.

Figure 4A:
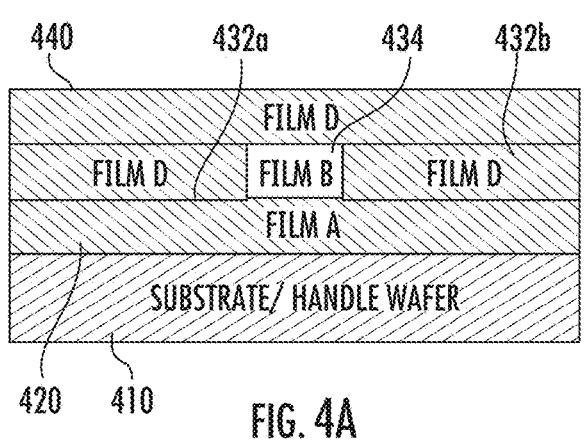
FIGS. 4A and 4B are cross-sectional views of examples of photonic devices for propagating both TE-polarized and TM-polarized light, according to aspects of the present invention.
Figure 4B:
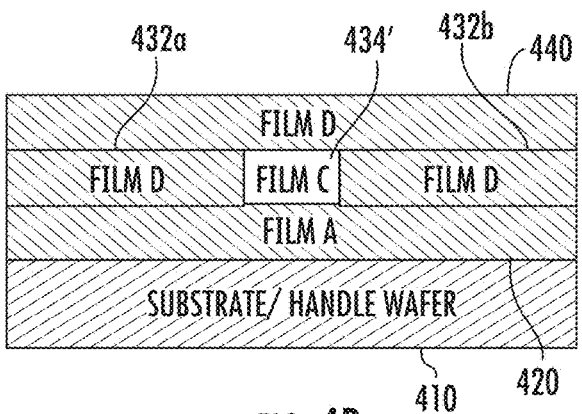

FIGS. 4A and 4B show a waveguide core 434, 434' comprising Film B and Film C, respectively, with the cores being surrounded by a cladding of a Film D 440 on the top and sides 432a and 432b and a bottom Film A 420 on the bottom. In these arrangements, the refractive indices $n_A$ and $n_D$ are sufficiently low in comparison to the birefringent indices $n_{TE}$ and $n_{TM}$ of Film B and C such that modes of both of the polarizations are supported. The horizontal extent of Film D 440 need only be large enough to prevent evanescent coupling from the waveguide core into the rest of the device layer. For example, typical minimum widths may be from 0.5 to 3 microns. Waveguides capable of supporting propagation of both polarizations will be referred herein as E/M waveguides.

Figure 5A:
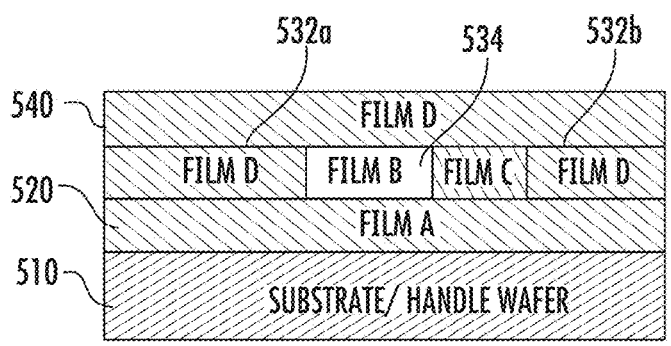
FIGS. 5A-5C are cross-sectional views of examples of transition regions of photonic device for controlling polarization, according to aspects of the present invention.
Figure 5B:
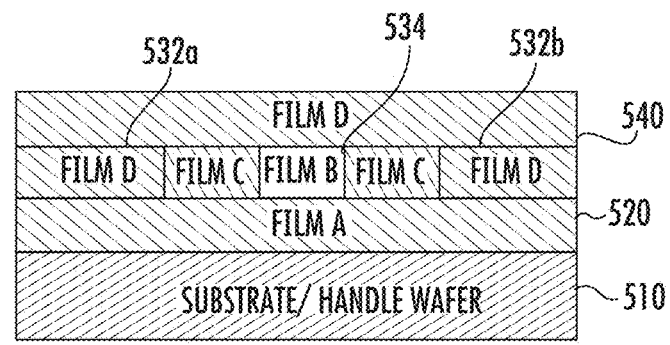
Figure 5C:
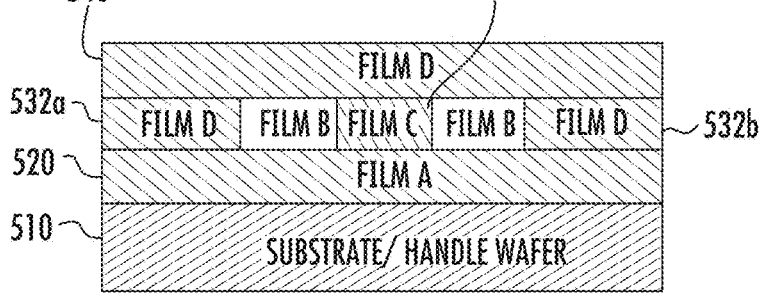

It is to be appreciated that combining the arrangements discussed with reference to FIGS. 1, 3, 4A and 4B enables layout and usage of unique waveguide devices that can achieve any desired polarization state, from pure TE operation, to bi-polarized operation, to pure TM operation. To achieve polarization-selective photonic devices using this technology, transitions between waveguides of these types may be exploited, which divide light based on polarization. During transitions to and from any of the arrangements of FIGS. 1, 3, 4A and 4B, a hybrid arrangement of materials may be employed, such as those in FIGS. 5A-5C. In all three hybrid arrangements, the relative widths of the Film B and Film C in the core region 534 are varied along the Z-direction and may take on any value in-between initial and final widths corresponding to other arrangements as described herein. These particular transition regions will be referred to in the context of examples of polarization-selective devices achievable using techniques according to aspects of the present invention. Typically, transition regions include a lower cladding 520, side claddings 532a and 532b, an upper cladding 540, all on a substrate 510.

Figure 6:
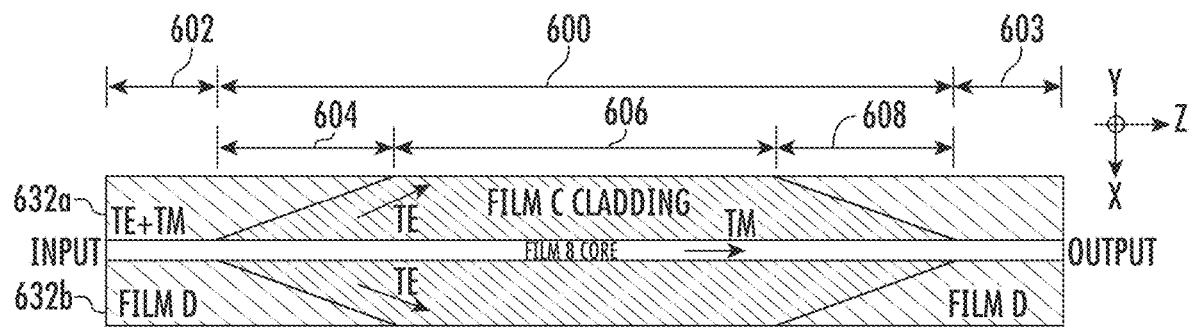
FIG. 6 is a top-view of an example of an arrangement of materials of a TM-pass polarizer (having an upper cladding omitted to facilitate viewing) according to aspects of the present invention.

One such device is a polarizer. Functionally, a polarizer is a device that is inserted into an optical waveguide path, which effectively attenuates light of one polarization but leaves the other polarization unaffected. It will be appreciated that, in a polarizer device, an upper cladding and lower cladding are present, but omitted from the FIG. 6 for ease of description. FIG. 6 is a top-view of a device layer of an example of a polarizer according to aspects of the present invention. For example, a TE-blocking polarizer 600 could be implemented as follows. Light is received from an input 602, which is an E/M waveguide (e.g., having a width 300 to 3000 nm) which undergoes an adiabatic transformation to a TM-only waveguide 606 by means of tapering away the Film D cladding and replacing it with Film C in an area surrounding the core, over a characteristic length (e.g., between 5 to 100 microns) in a transition region 604.

The transition region is sufficiently long so as to prevent coupling into higher-order modes. It will be appreciated that the arrangement corresponds to that seen in FIG. 5B. During propagation along the transition region, the TE light begins to radiate away as it does not belong to a supported mode in the waveguide. After the transition is complete (at which point the arrangement corresponds to FIG. 1), a TM-only waveguide is formed which propagates for some distance (e.g., between 10 to 300 microns) to ensure that no stray TE-polarized light remains, and then it undergoes a reciprocal transformation back (in transition region 608) to the E/M waveguide arrangement before reaching an output region 603. thus TM light is unaffected, while TE light is completely removed from the path, representing ideal polarizing behavior. It will be appreciated that propagation in regions 604, 606 and 608 is polarization-dependent, and regions 604, 606 and 608, individually and together, form a polarization-dependent region of polarizer 600. It will also be appreciated that although the above description assumed all light of a selected polarization was removed, in devices according to aspects of the present invention, the light of selected polarization may be removed to any suitable degree.

Figure 7A:
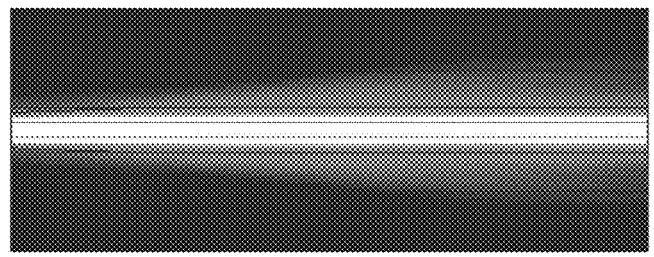
FIGS. 7A and 7B are top view snapshots of the propagation of TM and TE light, respectively, of a two-dimensional simulation of a polarizer as described with reference to FIG. 6.
Figure 7B:
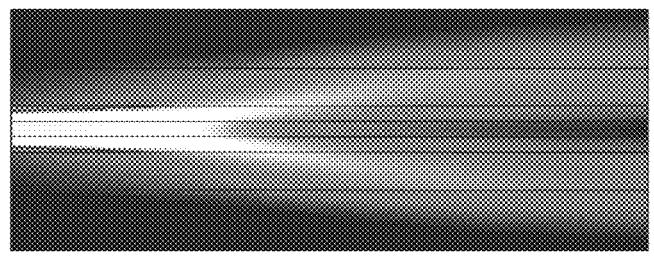

A snapshot of a two-dimensional simulation of a polarizer as described with reference to FIG. 6 is provided in FIGS. 7A and 7B. The simulated device showed <0.1 dB loss for the TM polarization and 23 dB attenuation for the TE polarization at a wavelength of 633 nm. When the wavelength is doubled (1266 nm), the loss for the TM polarization was 0.05 dB and the attenuation for the TE polarization was 31 dB. To date, it is believed no simulated or fabricated integrated polarizer has ever achieved such a wide bandwidth. It will be appreciated that higher extinction ratios can be achieved trivially by increasing the length of the single-polarization section. For example, simulations can be performed using the MULTIPHYSICS® simulation software available from COMSOL®, Inc of Burlington, Mass.

Figure 8:
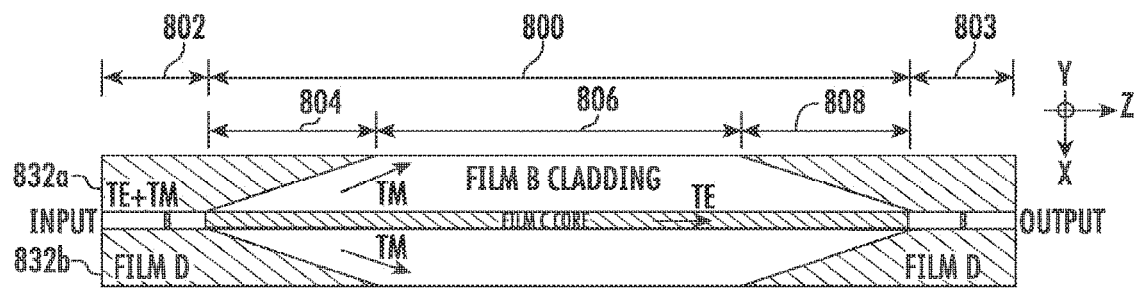
FIG. 8 is a top-view of an arrangement of materials of an example of a TE-pass polarizer according to aspects of the present invention.

Polarizers that block TM light are also readily achieved using techniques according to aspects of the present invention. FIG. 8 is a top-view of a device layer of an appropriate arrangement of material of an example of a polarizer 800 according to aspects of the present invention. An input E/M waveguide 802 and output E/M waveguide 803 utilize Film B as the core. The core is replaced by Film C at the onset of the initial taper of transition region 804 and likewise at the end of the taper of transition region 808 at output 803. It will be appreciated that propagation in regions 804, 806 and 808 is polarization-dependent, and regions 804, 806 and 808, individually and together, form a polarization-dependent region of polarizer 800.

Figure 9:
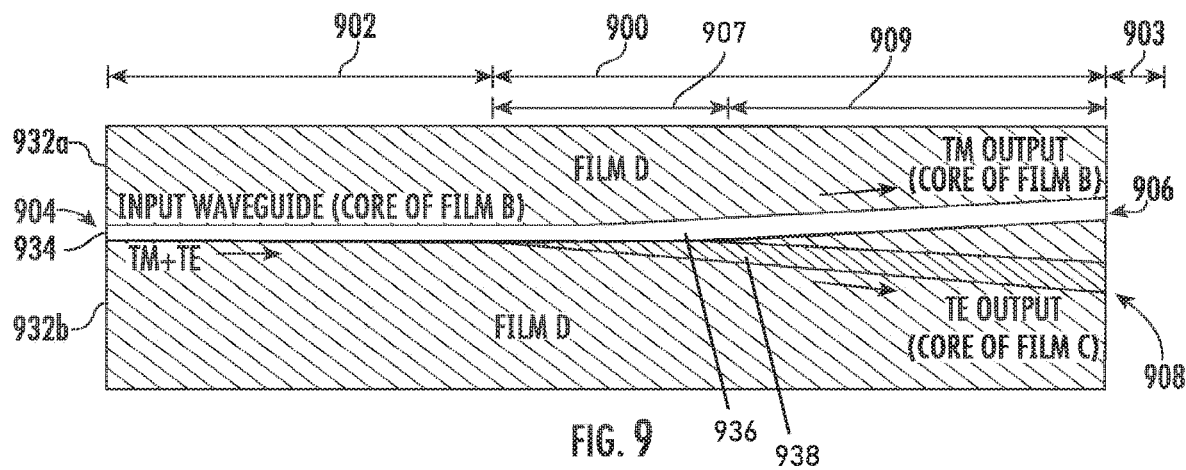
FIG. 9 is a top-view of an example of an arrangement of materials of a PBS according to aspects of the present invention.

Another integrated photonics device according to disclosed aspects is a PBS. A PBS is capable of taking the common input 904 (i.e., an input of TE-polarized and TM-polarized light) and splitting light of each polarization into a separate output 906, 908 as shown in FIG. 9. It is typically desirable that the splitting occur with low intrinsic losses and low crosstalk (the undesired polarization in a given output).

FIG. 9 is a top-view of an example of an arrangement of materials of a PBS 900 according to a disclosed aspect. The input waveguide is an E/M waveguide 902 with core 934 consisting of Film B and side claddings 932a and 932b of film D, with the waveguide core 934 having a width of 300-3000 nm and a thickness of 100 nm to 2,000 nm. Structurally, PBS 900 is similar to a conventional "Y-junction splitter," a component that acts as a 50:50 splitter. Core 934 is gradually widened by a factor between 1.3 to 3 times over a transition region 907 (e.g., having a length between 5 to 100 microns). In the illustrated embodiment, core 934 comprises an input core 936 and a transition core 938. In the illustrated embodiment, in transition region 907, the input core 936 has a uniform width and the transition core 938 has a width that increases along the direction of propagation of light. In the illustrated embodiment, core 934 is widened on its lower side as transition core 938 gets wider. In the illustrated embodiment the transition core consists of Film C.

In the illustrated embodiment, once the transition core reaches its maximum width, the waveguide core consists of equal parts of Film B and Film C. In the transition region 907, the core has a hybrid arrangement comprising film B and film C. Next, in the separation region 909, the two core materials (i.e., Film B and Film C) are split apart by a triangular wedge as the Film D cladding is introduced between core materials. For example, the internal angle at which the two cores are split may be from 0.1 to 10 degrees. The above arrangement results in the TM and TE polarizations splitting into separate arms with a high degree of efficiency. Once the arms are diverged by a sufficient spacing so as to prevent coupling between the arms, the lower arm corresponding to where the TE output is diverted may be replaced with Film B again (not shown). The upper arm with its Film B core is where the TM output light is diverted.

Figure 10A:
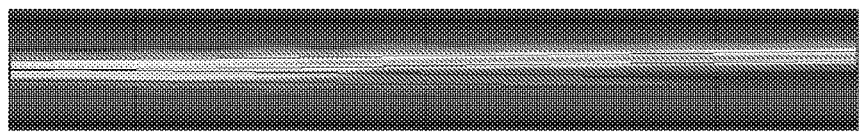
FIGS. 10A and 10B are 2D top view simulations of a PBS having the arrangement of FIG. 9 showing the TM-polarized and TE-polarized light, respectively.
Figure 10B:
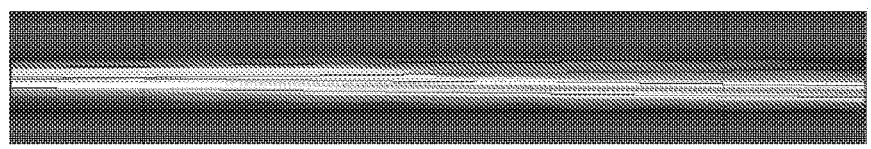

At 633 nm wavelength, an insertion loss of 0.16 dB was calculated for the TE output, and 0.05 dB for the TM output. For a 1266 nm wavelength, the loss for both ports becomes negligible (<0.01 dB). FIGS. 10A and 10B are snapshots of splitting simulations for the TM-polarized and TE-polarized 1266 nm light, respectively, for a PBS 900 shown in FIG. 9.

It is apparent that the TM light is diverted into the upper waveguide and the TE light is directed into the lower waveguide.

Figure 11:
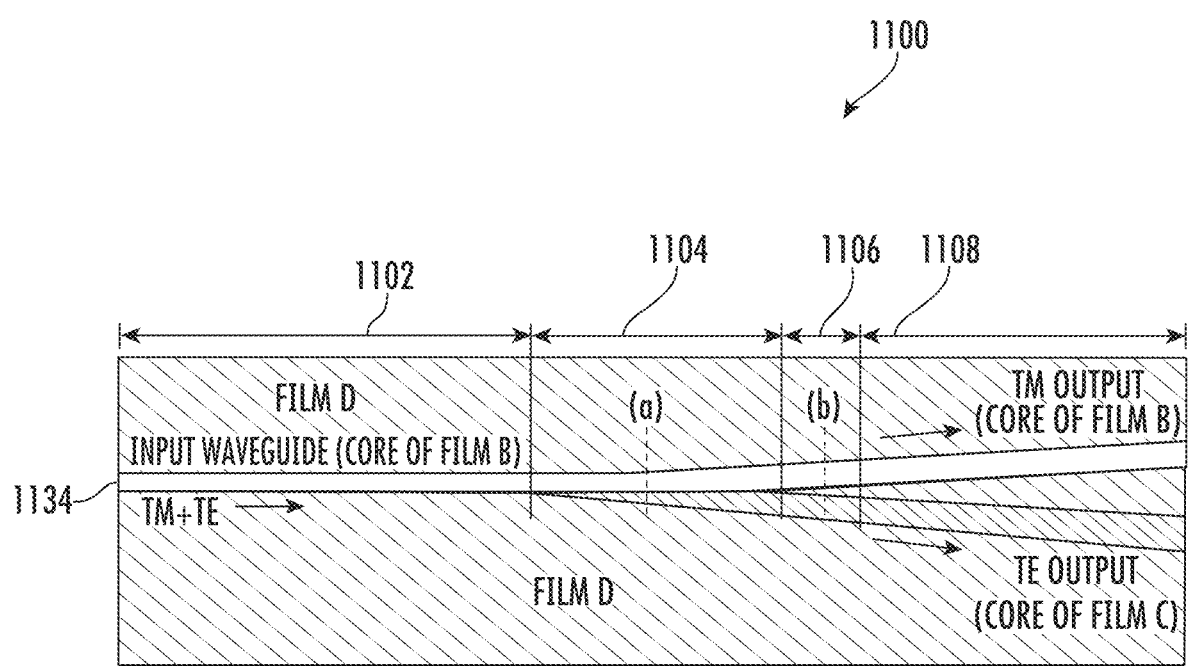
FIG. 11 is a top view of another embodiment of a PBS according to aspects of the present invention.

FIG. 11 is a top view of another embodiment of a PBS 1100 according to aspects of the present invention. An input E/M waveguide 1102 having a core 1134 (Film B) providing an input into PBS 1100. Core 1134 is widened in a first transition region 1104 using Film C. In a second transition region 1106, core 1134 is widened using Film B, while keeping the width of the Film C fixed. Multiple spatial modes may be supported in the waveguides in this particular embodiment, although the length of the structure can be made sufficiently long to avoid coupling into those modes; a total PBS length of 30 to 500 microns may be suitable depending on the wavelength of interest. The maximum width of each core should be large enough such that the optical modes for TE and TM polarizations are well-separated once the two core materials are split apart in separation region 1108 by a wedge of Film D. A suitable maximum width could be from 800 to 3000 nm for each core area, and each widening section could be between 10-100 microns in length. Although in the embodiments described above the input cores were made of Film B and the transition cores were made of Film C, it will be appreciated that an input core can be made of Film C and that a transition core can be made of Film B.

Techniques according to aspects of the present invention also enable optical devices that are not possible with conventional integrated photonics. The ability to design anisotropy into specific structures can be used to change coupling conditions between different waveguides. One example apparatus/application of this is a "polarization-cloaked resonator". A polarization-cloaked resonator consists of a circular ring waveguide (ring resonator) coupled to a "bus" waveguide. The nominal widths of both waveguides are ideally chosen to confine only a single transverse optical mode in the horizontal (in the plane of the surface) direction.

Figure 12:
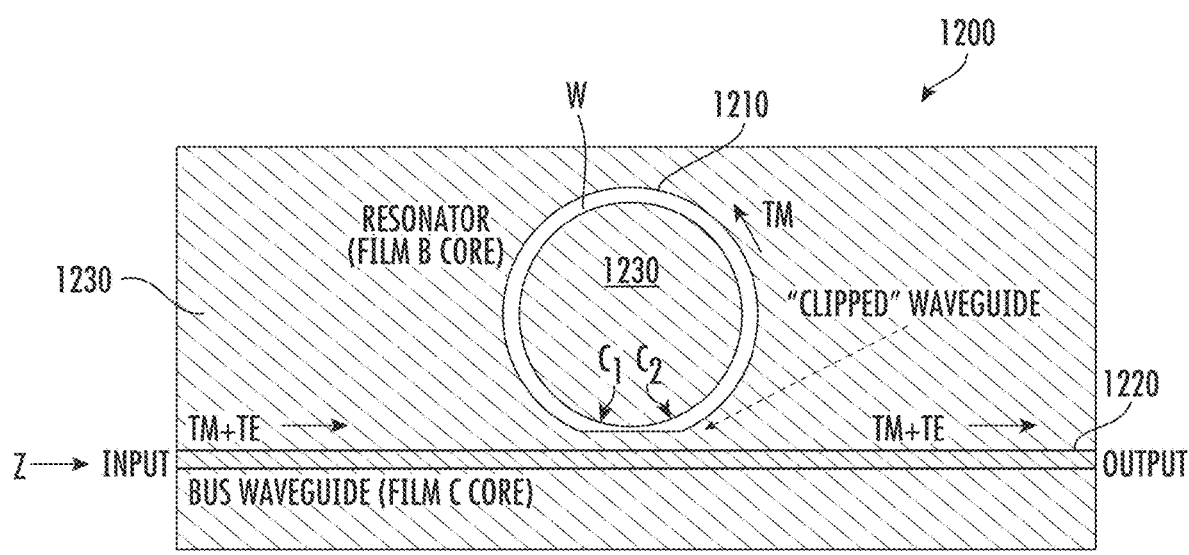
FIG. 12 is a top view schematic of a TE-cloaked resonator having a clipped resonator waveguide.
Figure 13A:
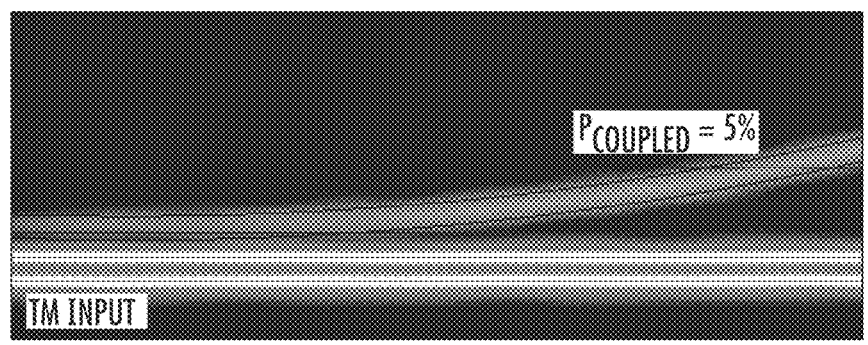
FIGS. 13A and 13B are top views of two-dimensional simulations of the TE-cloaked resonator of FIG. 12 showing a portion of the TM-polarized light being directed into the resonator, and negligible TE-polarized light being directed into the resonator, respectively.
Figure 13B:
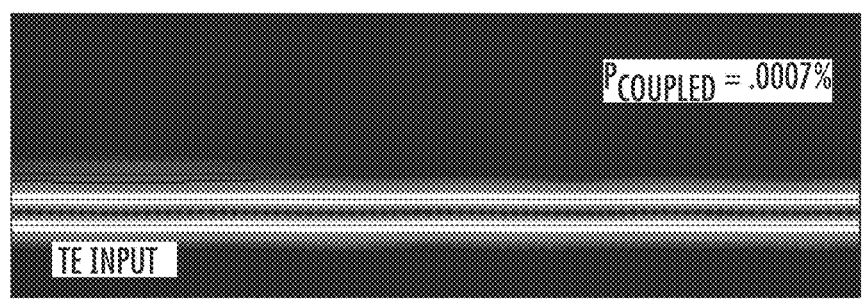

FIG. 12 is a top view schematic of a TE-cloaked resonator 1200. In one embodiment of a "TE-cloaked resonator," the bus waveguide core 1220 consists of film C. The ring waveguide core 1210 is of film B having a width W transverse to core 1210. Both waveguides are of the E/M type, having a surrounding cladding 1230 consisting of Film D. The bus waveguide passes within a small gap G (100 nm to 3,000 nm) away from the ring waveguide to control the amount of light that is evanescently coupled in and out of the resonator 1200. In the vicinity of their smallest separation, a tapering or "clipping" of the ring waveguide is applied to gradually reduce its width (in a direction transverse to the core longitudinal axis) in region $C_1$, and then in a region $C_2$ the width (transverse to the core longitudinal axis) is increased it as it passes away from bus 1220. Light travels in direction Z. It will be appreciated that region $C_2$ is further along direction Z than region $C_1$. The extent of clipping should consist of a reduction in the ring waveguide width from W, by a fraction between 0.1 and 0.6. The clipping, combined with the intrinsic anisotropy due to film C in the bus waveguide results in only TM-polarized light being coupled into ring resonator 1210. For TE-polarized light injected through the input, almost none is coupled into the resonator and no losses result from it. Simulation results are provided in FIG. 13 for light having a wavelength 1000 nm show that the TM power coupling can be 38 dB stronger than the TE power coupling.

Figure 14:
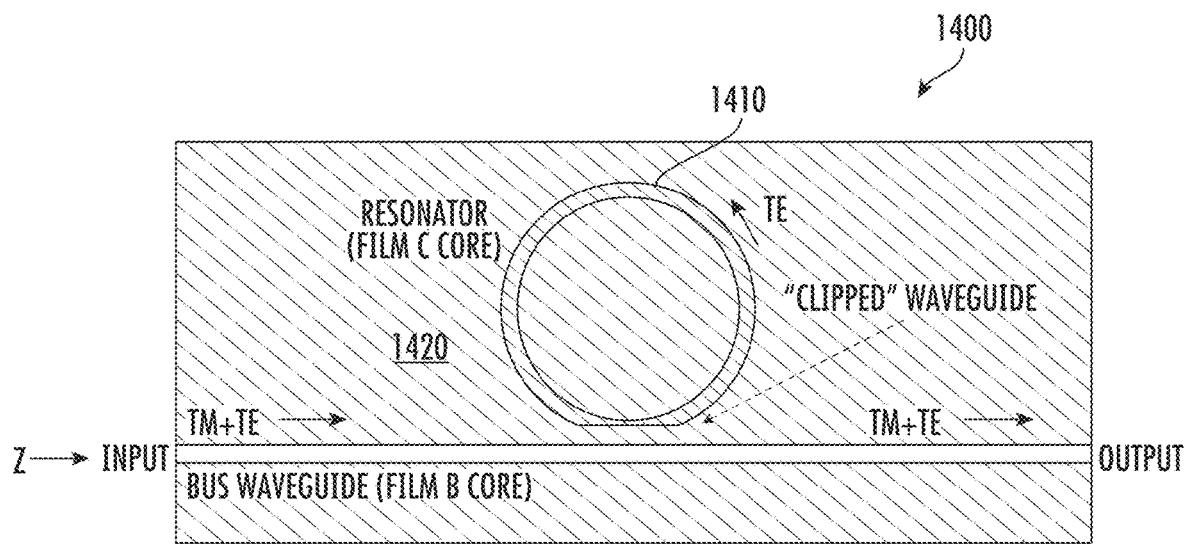
FIG. 14 is a top view schematic of a TM-cloaked resonator achieved by reversing the core materials of the bus and resonator of FIG. 12.

FIG. 14 is a top view schematic of a TM-cloaked resonator 1400 achieved by reversing the core materials of the bus waveguide 1420 and ring waveguide 1410 relative to the bus waveguide 1220 and ring waveguide 1210 of resonator 1200. In resonator 1400, the opposite relationship between polarizations is achieved relative to resonator 1200. It is to be appreciated that the polarization-selective nature of this coupling strength is maintained over a broad wavelength range since it does not depend on resonant effects. It is also to be appreciated that the same "clipped" coupling approach is useful for directional couplers, which are designed to transmit a fraction of power from one waveguide to another.

Figure 15:
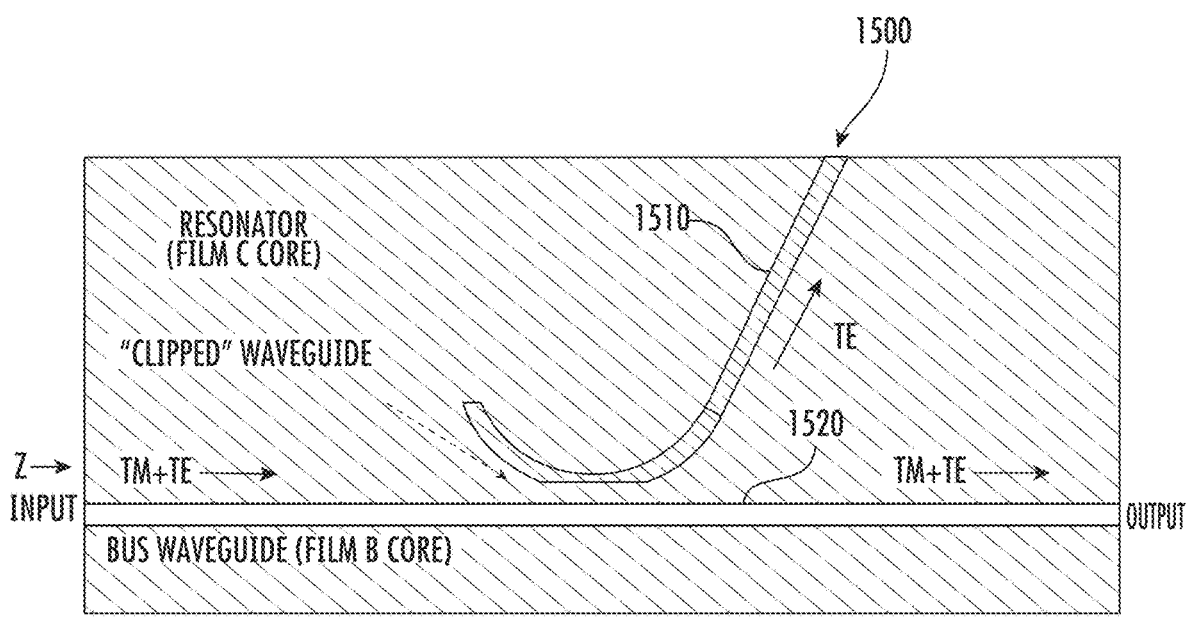
FIG. 15 is a top view of a direction coupler employing "clipped" coupling for coupling-out a fraction of energy of TE-polarized light from bus waveguide to second waveguide.

FIG. 15 is a top view of a direction coupler 1500 employing "clipped" coupling for coupling-out a fraction of energy of TE-polarized light from bus waveguide 1520 to second waveguide 1510, but not the TM-polarization light. It will be appreciated that film B and Film C materials of the bus waveguide and second waveguide may be swapped to couple the orthogonal polarization of light to couple-out a fraction of energy of TM-polarized light, but not TE-polarized light.

Example methods of fabricating the above-described devices and material arrangements are described below. It will be appreciated that the devices and material arrangements described above are not limited to those constructed using methods described.

Selected steps of methods of fabricating are described below with reference to FIGS. 16-26.

Figure 16:
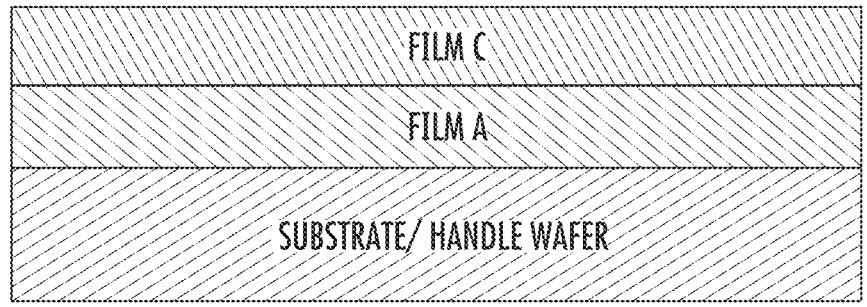
FIGS. 16-26 illustrate selected steps of methods of fabricating devices according to some aspects of the present invention.

1. In FIG. 16, a substrate/handle wafer is coated with Film A (lower cladding), followed by depositing a Film C on Film A. As described below, Film C after etching will form a part of the side cladding around the later formed core film (Film B) to provide one of the alternating layers of a first material having a first index of refraction and second material having a second index of refraction that is different than the first material.

Figure 17:
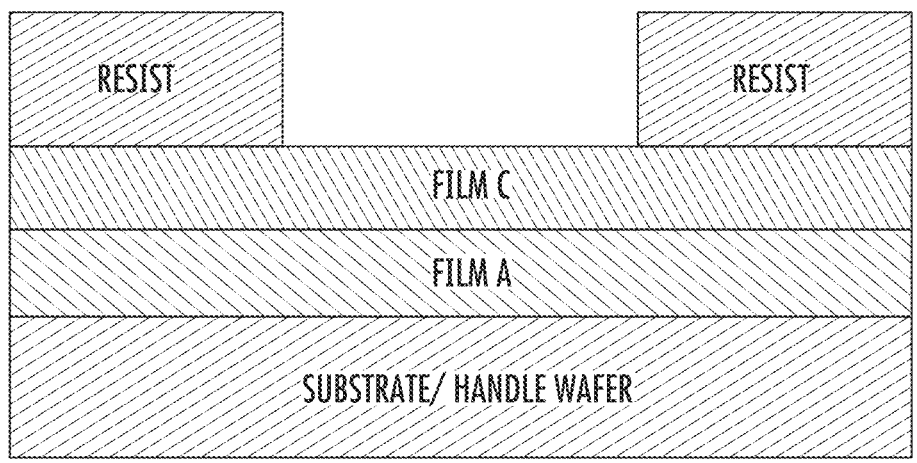
Figure 18:
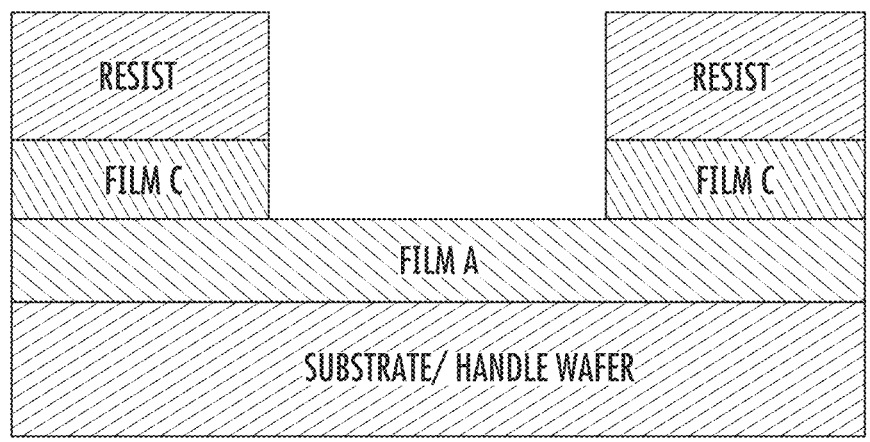

2. In FIG. 17, a suitable etch mask such as comprising photoresist is coated and patterned with lithography to facilitate formation of features to be etched into Film C to enable forming the core film (film B) in the trenches between Film C features;

3. In FIG. 18, selective dry etching of Film C is performed all the way to the top interface of Film A. Although only 1 trench through Film C is shown for simplicity, there is a plurality of trenches simultaneously formed (typically at least hundreds of trenches formed, for example thousands of trenches, to enable forming a disclosed alternating structure.

Figure 19:
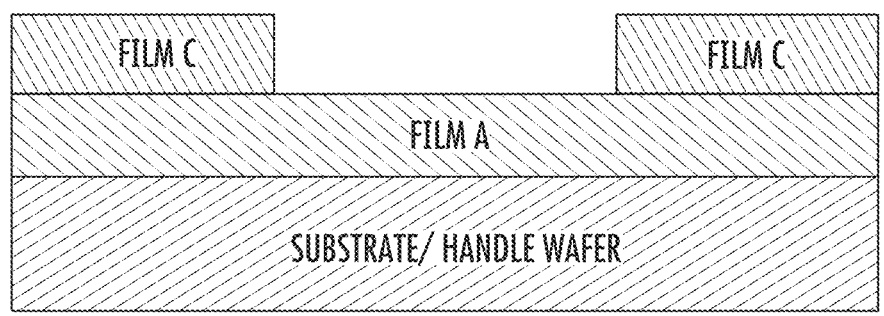
Figure 20:
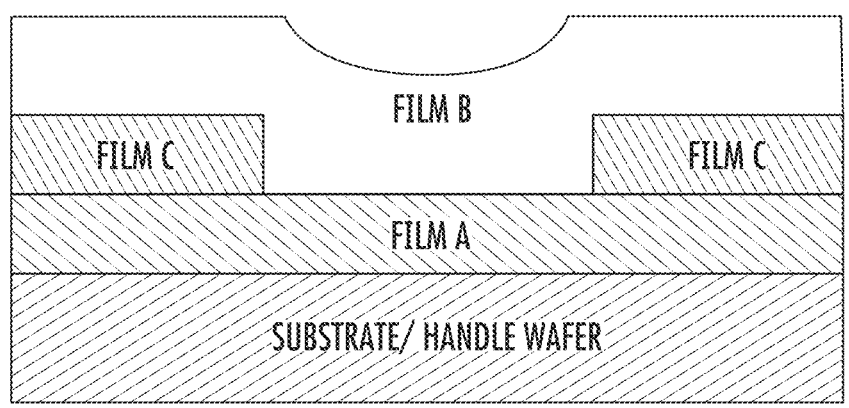
Figure 21A:
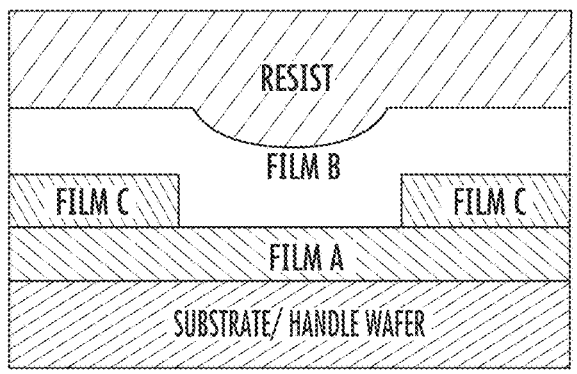
Figure 21B:
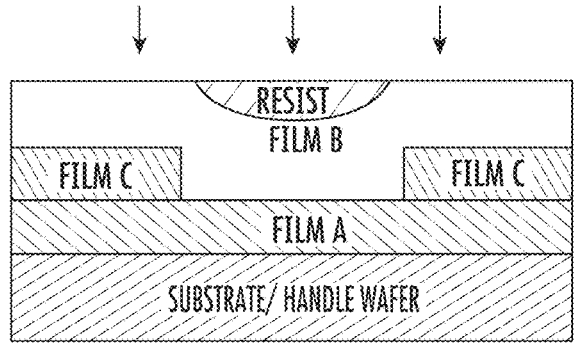
Figure 22:
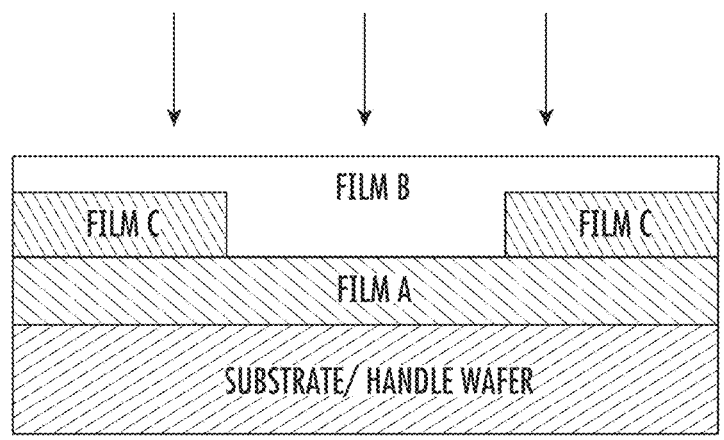
Figure 23:
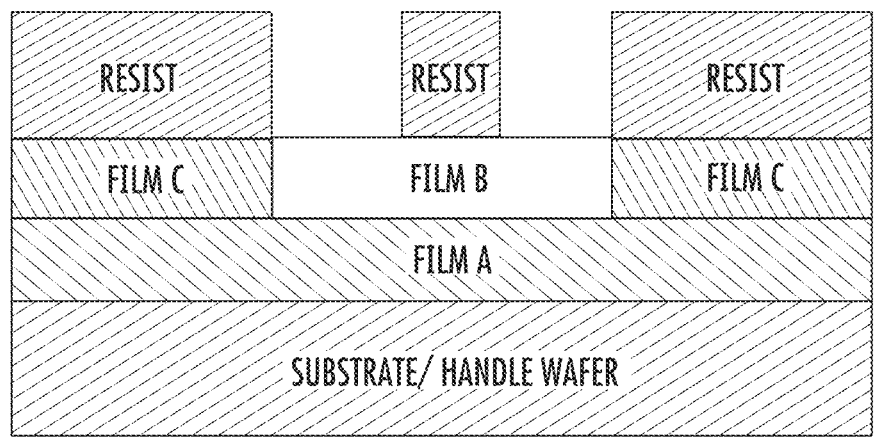
Figure 24:
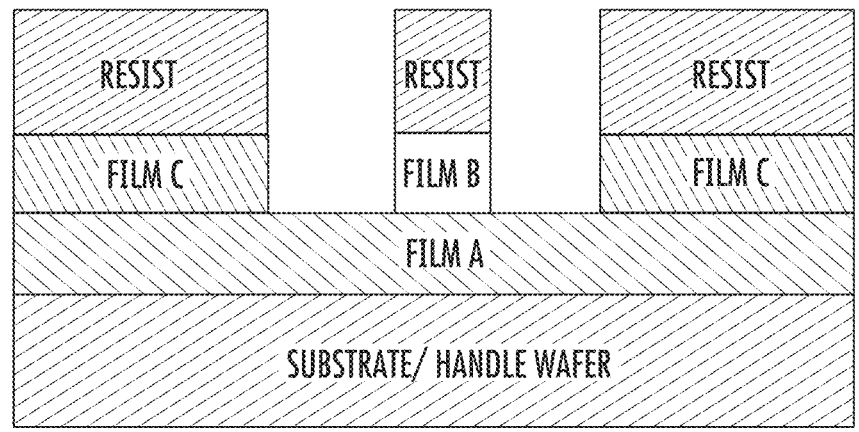
Figure 25:
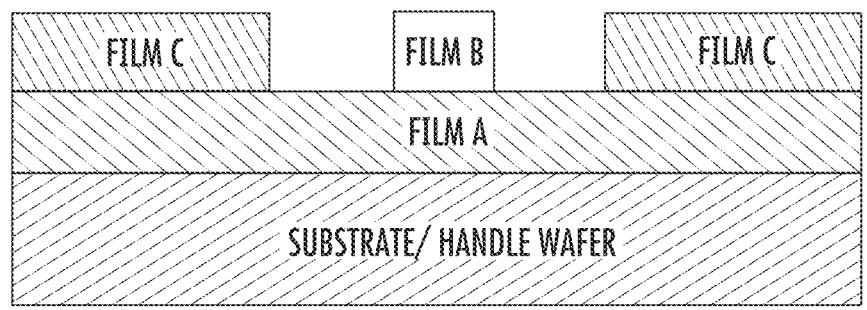
Figure 26:
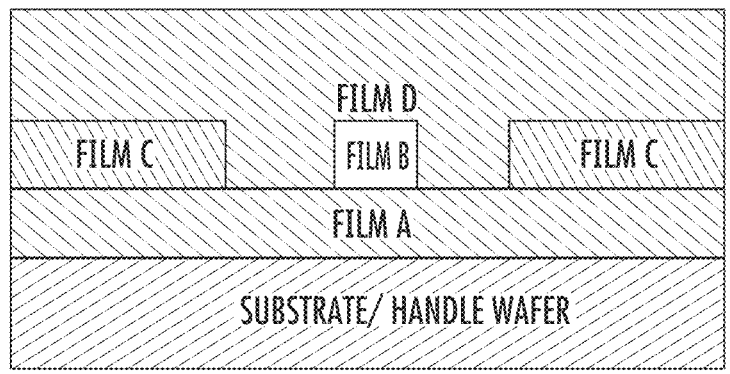

4. In FIG. 19, the resist etch mask shown as resist is removed using solvent cleaning or plasma cleaning;

5. In FIG. 20, Film B (the core film) is deposited onto the wafer surface, to a sufficient thickness so that any etched surfaces (the trenches between the Film C features) are completely filled and are generally provided to a minimum height of 300 nm above the top surface of Film C;

6. In a next step, excess material of Film B is removed to flatten the overall surface of the wafer at the level of the top surface of Film C (commonly referred to as planarization). Planarization may be achieved, for example, using one of the following techniques:
  (i) In FIG. 21A, the surface of Film B is coated with a polymer film with suitable planarization characteristics, followed by plasma etching with equal selectivity between the resist and Film B (as illustrated in FIG. 21B) until the top surface of Film C is reached, or
  (ii) In FIG. 22, Film B chemical-mechanical polished (CMP) is used to bring it down to the top surface of Film C and thereby flatten it;

7. In FIG. 23, an additional lithography is performed to pattern an etch mask shown as resist into some areas of the wafer surface, shown with resist openings over Film B, wherever prescribed by the necessary design;

8. In FIG. 24, exposed areas of Film B are plasma etched to form trenches down to the top interface of Film A;

9. In FIG. 25, the resist is removed generally using a solvent or plasma cleaning;

10. In FIG. 26, a 0.5 μm to 5 μm thick layer of Film D (the upper cladding) is deposited to cover the etched sidewalls of any features (trenches) in Film B, and to fully cover the top surface, making the resulting photonic device structure completed in the vertical direction. As a result, in this example the side cladding comprises film D around the core film B, with the alternating structure comprising film C features alternating with film D features.

The method of fabrication described above can be applied using any of a plurality of materials as films A-D, as well as the handle/substrate. Films A-D may comprise either dielectric or semiconductor materials, or some combination thereof. Dielectric materials, can include (but are not limited to) silicon-based compounds such as amorphous silicon, silicon dioxide, silicon nitride, silicon oxynitride, silicon carbide or silicon monoxide. Other materials of interest can include tantalum pentoxide, titanium dioxide, zinc sulfide, zinc selenide, hafnium oxide, aluminum oxide, aluminum nitride, silicate compounds (including glasses such as HYDEX), or fluoride compounds such as magnesium fluoride or calcium fluoride. In principle, any dielectric materials may be used for films A-D, provided their combination satisfies the refractive index relationships as set forth above. Chalcogenide materials may be employed as well given their large tunability in refractive index; such materials may include variable glass compositions employing germanium, arsenic, sulfur, antimony and/or selenium. Semiconductor material systems may also be employed, including materials and alloys such as silicon, silicon-germanium, and germanium, or of Group III-V compounds (where Group III includes elements such as Germanium, Aluminum, Indium, etc. and Group V includes elements such as nitrogen, phosphorus, arsenic, etc.). Such semiconductor systems are suitable for embodiments of this invention which employ epitaxial growth methods.

Concerning Film C (the side cladding film), which itself as described above can comprise an alternating stack of two different materials with refractive indices $n_H$ and $n_L$, it may be deposited on the substrate either by epitaxial growth, sputtering, metalorganic chemical vapor deposition (MOCVD), vacuum evaporation, plasma-enhanced chemical vapor deposition (PECVD), or low-pressure chemical vapor deposition (LPCVD), inductively-coupled plasma-enhanced chemical vapor deposition (ICP-PECVD), or any other technique of depositing materials with suitable refractive indices in an alternating combination as prescribed, typically with low interface roughness <50 angstroms and in thicknesses ranging from 5-300 nm for each layer.

Concerning Film B (the core film), it typically comprises a material that can be deposited into the etched trenches of Film C, such that a conformal and smooth coating of the sidewalls is achieved without voids or inhomogeneities. Additionally, it is desirable that it is optically isotropic in order to maintain the proper relationship between refractive indices of the core and cladding. To suitably deposit Film B, vacuum evaporation methods may be applied assuming the substrate is rotated or translated during the process in order to expose the etched sidewalls of trenches to incoming material evenly. Chemical vapor deposition methods as described above are all generally suitable as they may provide conformal coating on sidewalls. Epitaxial growth may also be applied, provided that low-stress growth on the etched surfaces of Film C and potentially the exposed Film D (upper cladding) is possible.

Concerning Film A, the lower cladding film, it can either be the same material as the substrate if the refractive index is suitable, or it may be achieved by partial oxidation of the substrate (as in the oxidation of silicon to achieve silicon dioxide), or by any deposition means mentioned prior. If single-crystal growth quality is required (in the case of epitaxial growth or MOCVD), it typically consists of a suitable single-crystal material upon which to grow the constituents of Film C.

Concerning Film D, a similar characteristic of being able to conformally coat steep sidewalls (similar to Film B) is typically desirable, and the same suite of deposition methods and characteristics applies to Film D as to Film B. For both Films B and D, the depositable thickness should be able to exceed the etched trench depth in order to achieve the desired optical properties.

Although many such combinations may be possible as described above, it is useful to detail particular embodiments that are readily envisioned. For example, in one specific arrangement, Films A and D may comprise silicon dioxide, Film B silicon oxynitride (with a suitable composition to achieve the refractive index requirements stated earlier), and Film C comprising alternating films of silicon nitride (to achieve $n_H$) and silicon dioxide (to achieve $n_L$). Films A, B, C, and D may all be deposited by any means of chemical vapor deposition (excluding MOCVD).

Figure 27:
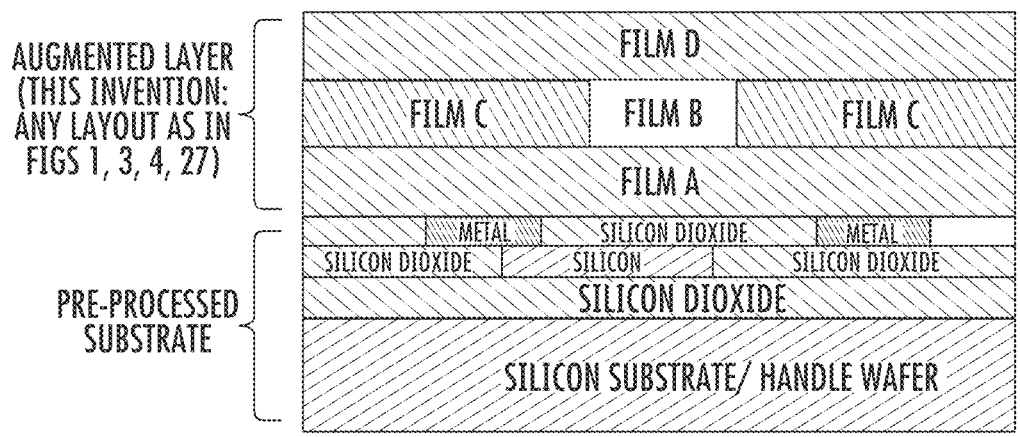
FIG. 27 illustrates an example of an embodiment of a system according to aspects of the present invention including a wave guide device added to augment a pre-processed substrate.

Concerning the handle wafer, it may comprise any mechanically stable semiconductor or dielectric material, but advantageously either silicon dioxide or silicon as they are generally more affordable to manufacture. However, this invention represents a self-contained system of three layers (lower cladding, device layer, and upper cladding) that can in principle augment any substrate underneath. The substrate itself may already possess a variety of materials and devices on its top surface prior to the addition of the embodied technology. For example, the substrate can comprise an integrated silicon photonic chip possessing silicon waveguides and metal interconnect features. Typically, the only requirements set forth prior to the addition of this technology is that the top surface is planarized or flat, that it provides sufficient adherence to subsequent films that are deposited, and that none of its materials break down in the process of depositing films A-D. An example of a suitable arrangement for the case of augmenting a pre-processed substrate is given in FIG. 27.

Those skilled in the art will recognize that the arrangement and composition of the pre-processed substrate is not limited to that pictured. Other relevant arrangements may include a photonic integrated circuit comprising Indium Phosphide- or Gallium Arsenide-based photonic devices. Interfacing of the pre-processed substrate with the augmented layer of this invention may be achieved, for example, by various means such as grating couplers, tapered waveguide directional couplers, or angled reflectors, which are well-known in this field of research.

EXAMPLES

Disclosed embodiments of the invention are further illustrated by the following specific Examples, which should not be construed as limiting the scope or content of this Disclosure in any way.

Example 1

In this Example, dielectric materials were chosen to implement the device on a silicon substrate. Silicon dioxide was selected for the upper cladding (Film A), lower cladding (Film D) and one of the layers of film C (side cladding), layer $n_L$. Silicon nitride was selected for other layer $n_H$ of film C (side cladding); and silicon oxynitride was selected for the core film (Film B). Low slab propagation losses were measured in the multilayer stacks as well as the silicon oxynitride layers.

Figure 28A:
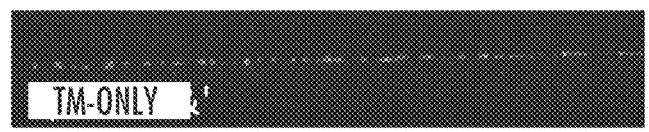
FIGS. 28A and 28B show low-loss propagation as observed from the top surface of a chip having a TM-only waveguide and a TE-only waveguide, respectively.
Figure 28B:
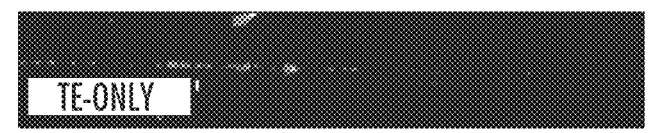

Waveguides were fabricated using these material for Films A-D, and tested at a 633 nm wavelength. FIG. 28A shows low-loss propagation as observed from the top surface of a chip having a disclosed TM-only waveguide; and FIG. 28B shows low-loss propagation as observed from the top surface of the chip having a disclosed TE-only waveguide. These results validate that the disclosed multilayer structure exhibits the anisotropy that provides birefringence to achieve polarization-selective waveguiding.

A test embodiment of a PBS was fabricated using these same material selections. The PBS showed good efficiency at routing each polarization into the desired output channel. Additionally, negligible crosstalk was present. The device was tested at 633 nm and 1110 nm wavelengths for both polarization inputs. An estimated extinction ratio >10 dB and insertion losses of <1.2 dB were achieved for both polarizations at both wavelengths, confirming the expected broadband performance.

Figure 29:
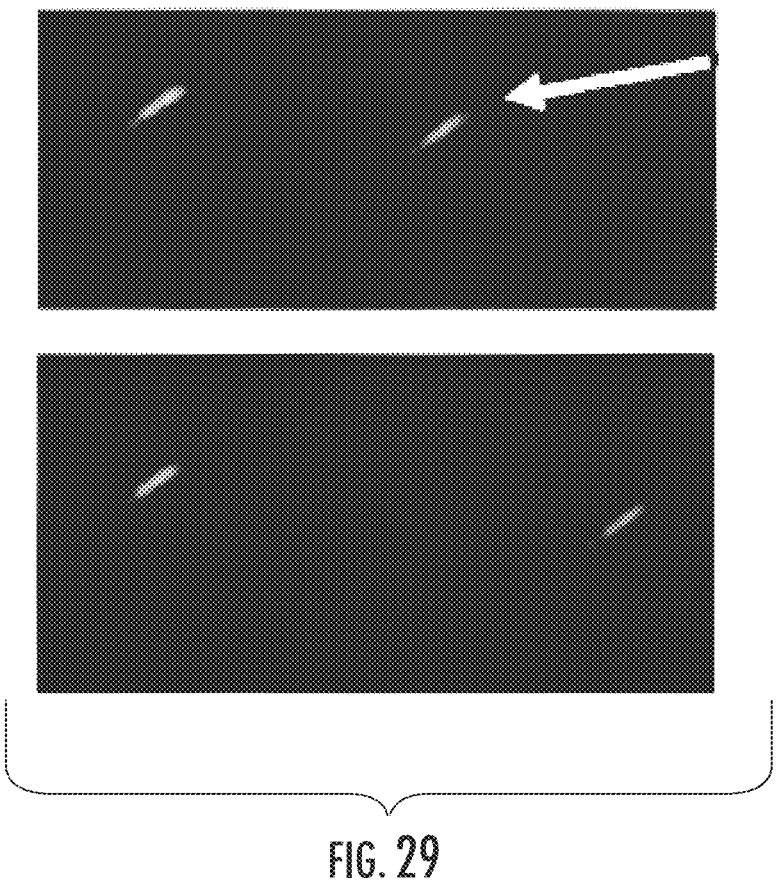
FIG. 29 includes top and bottom scanned digital optical images on the right side being an image of TE-polarized light and TM-polarized light exiting the ports of a PBS, and on the left side corresponding to reference paths.

FIG. 29 includes top and bottom are scanned digital optical images of light exiting the ports of a PBS according to disclosed aspects. On the right side of the top and bottom digital images show light exiting the TE and TM output ports. On the left side of the top and bottom images there is included a "reference" port with no PBS, showing the fraction of power routed to each port. The similar brightness of light from each of the output ports as the corresponding reference port is indicative of very low losses.

Those skilled in the art to which this Disclosure relates will appreciate that many other embodiments and variations of embodiments are possible within the scope of the claimed invention, and further additions, deletions, substitutions and modifications may be made to the described embodiments without departing from the scope of this Disclosure.

The invention claimed is:
1. A photonic device for guiding light having a wavelength ($\lambda$), comprising:
   a lower cladding layer on a substrate, the lower cladding layer extending in a plane parallel to a surface of the substrate;
   a device layer disposed on the lower cladding layer, the device layer having a thickness along a thickness direction perpendicular to the plane parallel to the surface of the substrate, the device layer comprising a first side cladding film and a second side cladding film, and a core film between the first and the second side cladding film; and
   an upper cladding layer disposed on the device layer, wherein the core film comprises one of (1) a material having an index of refraction $n_M$ and (2) alternating layers of a first material having a first index of refraction and second material having a second index of refraction that is different than the first material, the alternating layers arranged in a periodic structure that has a periodicity oriented along the thickness direction, wherein the alternating layers provide an effective index of refraction for TE polarized light $n_{TE}$ and a different effective index of refraction for TM polarized light $n_{TM}$, wherein each of the first side cladding film and the second side cladding film comprise the other of the material having the index of refraction $n_M$ and the alternating layers, wherein $n_{TM} < n_M < n_{TE}$ at the wavelength $\lambda$, and wherein the index of refraction of the upper cladding layer and the lower cladding layer are each less than $n_{TM}$, $n_M$ and $n_{TE}$ at the wavelength $\lambda$.

2. The photonic device of claim 1, wherein a difference between $n_{TM}$ and $n_M$ has a magnitude less than plus or minus 30% of the difference between $n_M$ and $n_{TE}$, at the wavelength $\lambda$.

3. The photonic device of claim 2, wherein the difference between $n_{TM}$ and $n_{TE}$ is in a range of 0.01 to 0.8.

4. The photonic device of claim 1, wherein the core film comprises the material having the index of refraction $n_M$.

5. The photonic device of claim 1, wherein the core film comprises the alternating layers.

6. The photonic device of claim 1, further comprising an input bi-polarized E/M waveguide supporting both transverse-Electric and transverse-Magnetic polarization-modes optically coupled to the core film.

7. The photonic device of claim 6, wherein the input E/M waveguide comprises:
an input E/M waveguide lower cladding layer;
an input E/M waveguide device layer disposed on the input E/M waveguide lower cladding layer, the input E/M waveguide device layer comprising an input E/M waveguide first cladding film, an input E/M waveguide second cladding film, and an input core, the input core disposed between the input E/M waveguide first cladding film and the input E/M waveguide second cladding film; and
an input E/M waveguide upper cladding layer disposed on the input E/M waveguide device layer,
the input core comprising a material having an index of refraction greater than the index of refraction of the input E/M waveguide lower cladding layer, the input E/M waveguide first cladding film, the input E/M waveguide second cladding film, and the upper cladding layer at the wavelength $\lambda$.

8. The photonic device of claim 7, wherein the photonic device is a polarizer, the polarizer further comprising:
a first transition region disposed between the input waveguide and a polarization-dependent region, wherein, in the first transition region, a width of the first side cladding film is disposed between the core film and a width of the input E/M waveguide first cladding film, and a width of the second side cladding film is disposed between the core film and a width of the input E/M waveguide second cladding film, wherein, in the first transition region, (1) the width of the first side cladding film increases and the width of the input E/M waveguide first cladding film decreases along a direction of light propagation and (2) the width of the second side cladding film increases and the width of the input E/M waveguide second cladding film decreases along the direction of light propagation.

9. The photonic device of claim 8, further comprising an output E/M waveguide having an output core optically coupled to the core film, at an opposite end from the input E/M waveguide.

10. The photonic device of claim 9, wherein the output E/M waveguide comprises:
an output E/M waveguide lower cladding layer;
an output E/M waveguide device layer disposed on the output E/M waveguide lower cladding layer, the output E/M waveguide device layer comprising an output E/M waveguide first cladding film, an output E/M waveguide second cladding film, and an input core, the input core disposed between the output E/M waveguide first cladding film and the output E/M waveguide second cladding film; and
an output E/M waveguide upper cladding layer disposed on the output E/M waveguide device layer,
the output core comprising a material having an index of refraction greater than the index of refraction of the output E/M waveguide lower cladding layer, the output E/M waveguide first cladding film, the output E/M waveguide second cladding film and the upper cladding layer at the wavelength $\lambda$.

11. The photonic device of claim 10, the device further comprising:
a second transition region disposed between the output waveguide and the polarization-dependent region, wherein, in the first transition region, a width of the first side cladding film is disposed between the core film and a width of the output E/M waveguide first cladding film, and a width of the second side cladding film is disposed between the core film and a width of the output E/M waveguide second cladding film,
wherein in the second transition region, (1) the width of the first side cladding film decreases and the width of the output E/M waveguide first cladding film increases along a direction of light propagation and (2) the width of the second side cladding film decreases and the width of the output E/M waveguide second cladding film increases along the direction of light propagation.

12. The photonic device of claim 11, wherein the polarizer is a TE-pass polarizer.

13. The photonic device of claim 11, wherein the polarizer is a TM-pass polarizer.

* * * * *